(12) United States Patent
Black

(10) Patent No.: US 6,286,777 B1
(45) Date of Patent: Sep. 11, 2001

(54) EXTENSION CORD STORAGE AND DISPENSING SYSTEM

(75) Inventor: Charles D. Black, Williston, ND (US)

(73) Assignee: Stringliner Company, Williston, ND (US)

(*) Notice: Subject to any disclaimer, the term of this patent is extended or adjusted under 35 U.S.C. 154(b) by 0 days.

(21) Appl. No.: 09/405,967

(22) Filed: Sep. 27, 1999

Related U.S. Application Data (63) Continuation-in-part of application No. 09/234,926, filed on Jan. 21, 1999, now Pat. No. 6,142,405.

(51) Int. Cl.⁷ .................................................. B65H 75/38
(52) U.S. Cl. ........................ 242/388.6; 242/402; 242/403; 242/405.2; 242/405.3
(58) Field of Search .................................. 242/388.6, 402, 242/403, 405.1, 405.2, 405.3

(56) References Cited

U.S. PATENT DOCUMENTS

| | | | |
|---|---|---|---|
| 593,745 | * 11/1897 | Hughes | 242/405.2 |
| 1,285,395 | * 11/1918 | Roche | 242/405.3 |
| 1,439,726 | * 12/1922 | Brown | 242/388.6 |
| 1,783,159 | * 11/1930 | Palmer | 242/405.3 X |
| 2,038,478 | * 4/1936 | Coombs | 242/402 |
| 2,393,613 | * 1/1946 | Combs | 242/405.3 X |
| 2,602,604 | * 7/1952 | Russell et al. | 242/388.6 |
| 3,143,316 | * 8/1964 | Shapiro | 242/405.3 |
| 3,476,332 | * 11/1969 | Sutz | 242/402 X |
| 3,529,786 | * 9/1970 | Holden | 242/388.6 X |
| 4,501,563 | * 2/1985 | Johnson et al. | 242/405.3 X |
| 5,957,401 | * 9/1999 | O'Donnell | 242/402 X |

FOREIGN PATENT DOCUMENTS

2125370 * 3/1984 (GB) ............................ 242/405.2 X

* cited by examiner

Primary Examiner—Donald P. Walsh
Assistant Examiner—Minh-Chau Pham
(74) Attorney, Agent, or Firm—Michael S. Neustal

(57) ABSTRACT

An extension cord storage and dispensing system for conveniently dispensing, accumulating and storing various lengths of one or more extension cords without significant entanglement occurring. The inventive device includes a frame having a first end, a middle portion and a second end, the frame includes a first spool and a second spool, a U-shaped cutout extending into a side of the frame, a handle attached to the frame opposite of the U-shaped cutout, and a pair of knobs rotatably attached to the first end and the second end of the frame. The pair of knobs are held by the user while the frame freely rotates upon the knobs thereby allowing the extension cord or other elongated object to be easily dispensed. When accumulating the extension cord after utilization, the user positions the inner portion of their elbow within the U-shaped cutout and grasps the handle with their hand thereby providing adequate leverage for the user while winding the extension cord about one of the spools. The frame preferably includes a plurality of slots with first nubs and second nubs for retaining the distal ends of the extension cord during storage.

20 Claims, 10 Drawing Sheets

EXTENSION CORD STORAGE AND DISPENSING SYSTEM

CROSS-REFERENCE TO RELATED U.S. PATENT APPLICATION

I hereby claim benefit under Title 35, United States Code, Section 120 of U.S. patent application Ser. No. 09/234,926 filed Jan. 21, 1999 now U.S. Pat. No. 6,142,405. This application is a continuation-in-part of the Ser. No. 09/234,926 application. The Ser. No. 09/234,926 application is currently pending and has received an Office Action dated Jun. 28, 1999. An amendment was filed in response to this Office Action on Sep. 22, 1999.

BACKGROUND OF THE INVENTION

1. Field of the Invention

The present invention relates generally to extension cords and more specifically it relates to an extension cord storage and dispensing system for conveniently dispensing, accumulating and storing various lengths of one or more extension cords without significant entanglement occurring.

Extension cords vary in length from 6 feet to over 100 feet. Extension cords are utilized to provide electrical power to locations not reachable by an electrical device's power cord. Consumers typically purchase shorter extension cords, such as 25 feet in length, to accommodate a majority of their electrical power needs. Consumers generally purchase long extension cords, such as 100 feet in length, to provide electrical power to locations far away from a conventional electrical outlet.

Hence, most consumers have both short and long extension cords to accommodate their needs. One common problem with long extension cords is that they become entangled and are difficult to store. Another problem with extension cords is that they are difficult to store or dispense without tangling of the cord occurring. Another problem is that long extension cords are not desirable to use in short spans such as 10–15 feet because of the amount of excess cord laying about the work site which can be extremely dangerous. Another problem is that many conventional outlets are at least four feet above the ground, hence requiring the complete unwrapping of the extension cord to allow the male end to be electrically coupled to the conventional outlet. Also, purchasing a plurality of extension cords of various lengths can be relatively expensive for the consumer. Hence, there is a need for a storage and dispensing device that will allow a user to easily dispense, windup and store without entanglement occurring.

2. Description of the Prior Art

Extension cords have been in use for years. Typically, the consumer will purchase both short and long extension cords to accommodate all of their needs. These extension cords are generally stored upon a single bracket attached to a wall, wrapped upon a stationary holder or simply laid upon a floor. These methods of storage result in the extension cords becoming entangled with one another making it difficult to dispense, accumulate and store the extension cords without the burden of untangling them.

With conventional holders, the extension cord is merely wrapped about a post with one end of the extension cord surrounded by the remaining length of the extension cord. To effectively utilize both ends of the extension cord, the entire extension cord must be unwrapped regardless of the length of extension cord required. In addition, dispensing, accumulating and storing the extension cord can be extremely burdensome for the user. Hence, there is a need for a cord dispensing and storage device that conveniently dispenses, accumulates and stores various lengths of one or more extension cords without significant entanglement occurring.

Examples of attempted extension cord storage and dispensing devices include U.S. Pat. Nos. 4,193,563 to Vitale; 4,261,529 to Sandberg et al; 3,626,495 to Bastian; 4,061,290 to Harrill; 4,244,536 to Harrill; 4,466,581 to Hill; and 3,837,448 to Hagstrom are all illustrative of such prior art.

Vitale (U.S. Pat. No. 4,193,563) discloses an extension cord storage device. Vitale specifically teaches a cross member base, two equally spaced vertical posts extending upwardly from the cross member base, an upper bar attached to the vertical posts, a handle attached to the upper bar, and a partition member secured to the center of the vertical posts thereby creating two spools that have an equal height.

Sandberg et al (U.S. Pat. No. 4,261,529) teaches string storage device. Sandberg et al specifically teaches a device for storing ropes having an elongate body with a pair of horns extending from opposite ends thereof and a pair of notches within the ends of the elongate body for capturing rope after spooled about the horns.

Bastian (U.S. Pat. No. 3,626,495) discloses a tangle free wire holder. More specifically, Bastian teaches two opposing V-shaped notches within an elongated body with a pair of slotted holes for locking a rope or other structure within.

Harrill (U.S. Pat. No. 4,061,290) discloses an extension cord reel and case. Harrill teaches a hollow cylindrical body open at one end, a stub shaft, and a wire spool having a fixed inner end flange rotatably journaled on the stub shaft.

Hill (U.S. Pat. No. 4,466,581) discloses a cable holder. Hill teaches a casing, a pair of annular housing elements mounted for rotation relative to the casing, and wherein each of the annular housing elements have central hub portions which abut and are locked together for joint rotation.

Hagstrom (U.S. Pat. No. 3,837,448) discloses a line cord caddy. Hagstrom teaches a spool having an extension cord wound upon and being encased within a stand-up type cover having a handgrip extending therefrom.

While these devices may be suitable for the particular purpose to which they address, none of them are suitable for conveniently dispensing, accumulating and storing various lengths of one or more extension cords without significant entanglement occurring. Conventional methods of storage and dispensing of long extension cords become entangled within the many feet of the extension cord, and do not allow effective utilization of both ends of the extension cord while still wrapped upon the storage device. Hence, there is a need for a storage and dispensing device that allows simultaneous dispensing lengths of both ends of the extension cord while a portion of the extension cord is retained orderly wrapped on the storage device.

In these respects, the extension cord storage and dispensing system according to the present invention substantially departs from the conventional concepts and designs of the prior art, and in so doing provides an apparatus primarily developed for the purpose of conveniently dispensing, accumulating and storing various lengths of one or more extension cords without significant entanglement occurring.

SUMMARY OF THE INVENTION

In view of the foregoing disadvantages inherent in the known types of extension cord storage and extension devices now present in the prior art, the present invention provides a new extension cord storage and dispensing system construction wherein the same can be utilized for conveniently storing, accumulating, and dispensing an elongated extension cord of various lengths without entanglement and without requiring the unwrapping of the entire length of extension cord to effectively utilize both ends.

The general purpose of the present invention, which will be described subsequently in greater detail, is to provide a new extension cord storage and dispensing system that has many of the advantages of the extension cord holders mentioned heretofore and many novel features that result in a new extension cord storage and dispensing system which is not anticipated, rendered obvious, suggested, or even implied by any of the prior art extension cord holders, either alone or in any combination thereof.

To attain this, the present invention generally comprises a frame having a first end, a middle portion and a second end, the frame includes a first spool and a second spool, a U-shaped cutout extending into a side of the frame, a handle attached to the frame opposite of the U-shaped cutout, and a pair of knobs rotatably attached to the first end and the second end of the frame. The pair of knobs are held by the user while the frame freely rotates upon the knobs thereby allowing the extension cord or other elongated object to be easily dispensed. When accumulating the extension cord after utilization, the user positions the inner portion of their elbow within the U-shaped cutout and grasps the handle with their hand thereby providing adequate leverage for the user while winding the extension cord about one of the spools. The frame preferably includes a plurality of slots with first nubs and second nubs for retaining the distal ends of the extension cord during storage.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an extension cord storage and dispensing system that will overcome the shortcomings of the prior art devices.

A further object is to provide an extension cord storage and dispensing system that allows an individual to easily dispense a length of extension cord.

An additional object is to provide an extension cord storage and dispensing system that allows an individual to easily support the device without significant strain being placed upon them when accumulating the extension cord about the structure.

A further object is to provide an extension cord storage and dispensing system that is capable of simultaneously receiving and storing a plurality of extension cords that may or may not be connected.

Another object is to provide an extension cord storage and dispensing system that reduces entanglement of an extension cord during repeated dispensing, storage and utilization.

An additional object is to provide an extension cord storage and dispensing system that easily dispenses a shorter length of a relatively long extension cord without interference of the remaining length.

A further object is to provide an extension cord storage and dispensing system that eliminates the need to have a plurality of extension cords of various lengths.

An additional object is to provide an extension cord storage and dispensing system that stores an extension cord during nonuse.

Another object is to provide an extension cord storage and dispensing system that is capable of storing various lengths of extension cords.

A further object is to provide a storage system that is capable of storing and dispensing extension cords, light strings, rope and other lengthy items in an organized manner.

Another object is to provide an extension cord storage and dispensing system that allows a user to effectively utilize both ends of a conventional extension cord without having to unwrap the entire length of extension cord.

A further object is to provide an extension cord storage and dispensing system that allows the user to transport an extension cord between areas without entanglement.

A further object is to provide an extension cord storage and dispensing system that catchably secures the opposing ends of the extension cord to prevent unwrapping.

Another object is to provide an extension cord storage and dispensing system that maintains the extension cord off contaminated floors while being utilized or stored.

A further object is to provide an extension cord storage and dispensing system that reduces the amount of torque placed upon the user's arm while supporting the frame while wrapping or dispensing an extension cord.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Turning now descriptively to the drawings, in which similar reference characters denote similar elements throughout the several view, FIGS. 1 through 10 illustrate an extension cord storage and dispensing system 10, which comprises a frame 20 having a first end 22, a middle portion 26 and a second end 24, the frame 20 includes a first spool 40 and a second spool 50, a U-shaped cutout 62 extending into a side of the frame 20, a handle 60 attached to the frame 20 opposite of the U-shaped cutout 62, and a pair of knobs 70a–b rotatably attached to the first end 22 and the second end 24 of the frame 20. The pair of knobs 70a–b are held by the user while the frame 20 freely rotates upon the knobs 70a–b thereby allowing the extension cord 12 or other elongated object to be easily dispensed. When accumulating the extension cord 12 after utilization, the user positions the inner portion of their elbow within the U-shaped cutout 62 and grasps the handle 60 with their hand 17 thereby providing adequate leverage for the user while winding the extension cord 12 about one of the spools. The frame 20 preferably includes a plurality of slots 30a–d with first nubs 32a–d and second nubs, 34a–d for retaining the distal ends of the extension cord 12 during storage.

Figure 3:
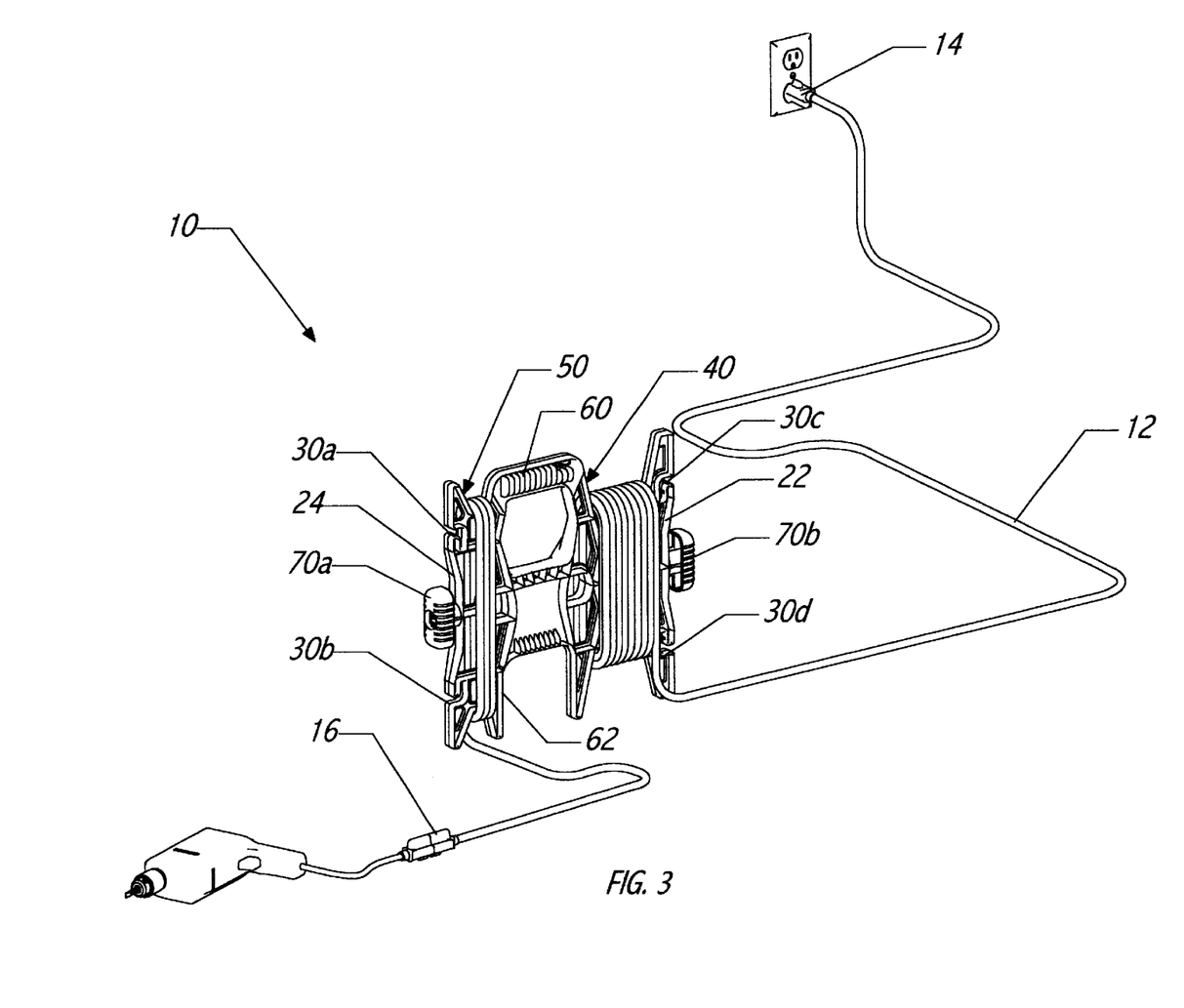
FIG. 3 is an upper perspective view of the present invention with one end connected to an outlet and the other end connected to a conventional drill.

As best shown in FIG. 3 of the drawings, a conventional extension cord 12 is an elongated structure having a male connector 14 and a female connector 16 at opposing ends. The present invention is designed to support one or more extension cords 12 during operation.

As shown in FIGS. 1 through 5, 7 and 9 of the drawings, the frame 20 is preferably a flat structure for providing a compact storage structure. However, it can be appreciated by one skilled in the art that the frame 20 may be comprised of any well-known shape or size.

Figure 7:
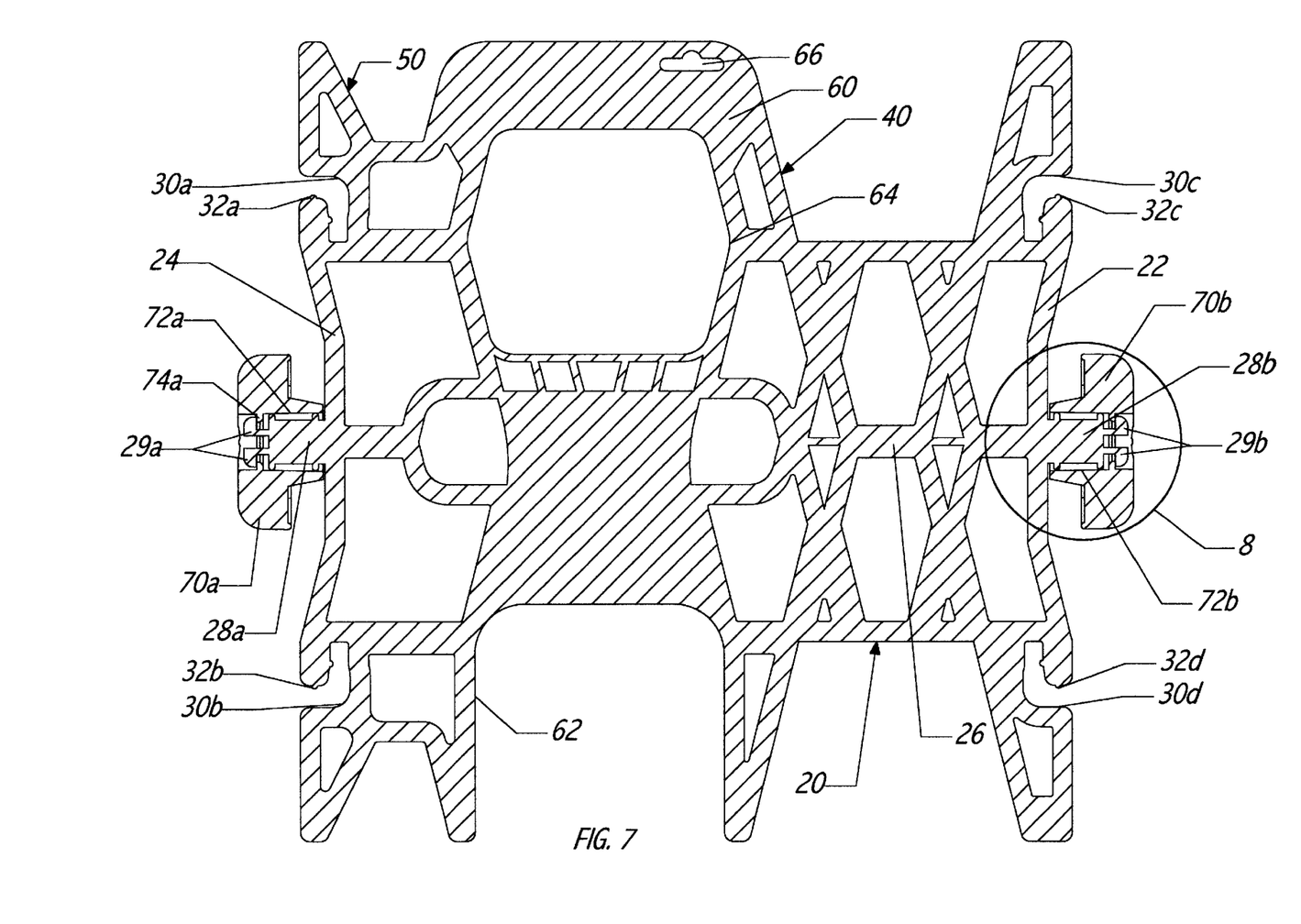
FIG. 7 is a cross sectional view taken along line 7—7 of FIG. 7.
Figure 9:
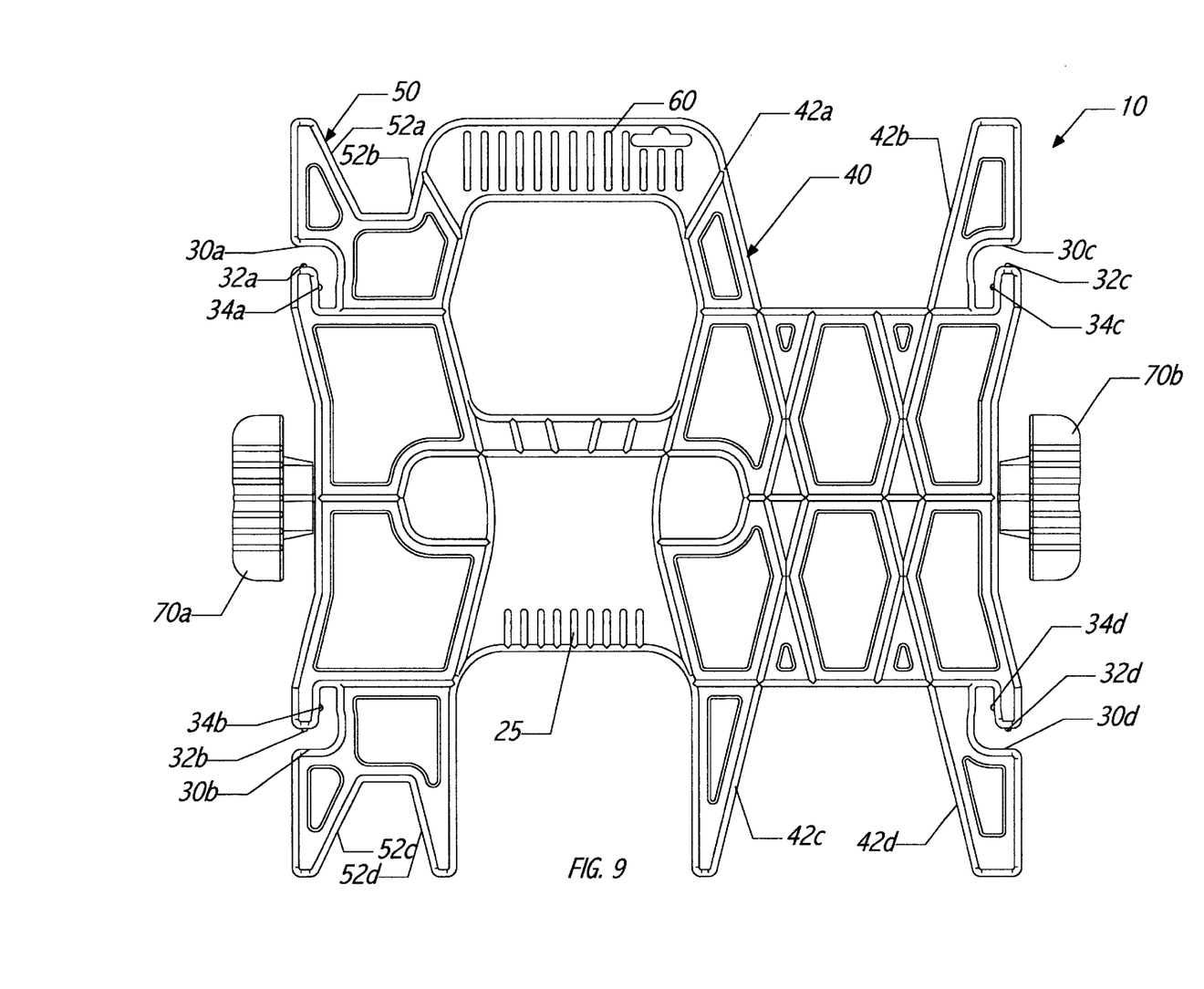
FIG. 9 is a side view of the present invention.

As best shown in FIGS. 7 and 9 of the drawings, the frame 20 comprises a first end 22, a middle portion 26 and a second end 24. The middle portion 26 of the frame 20 is preferably comprised of a plurality of cross members, however it can be appreciated that the frame 20 may be comprised of various designs, shapes and materials.

Figure 5:
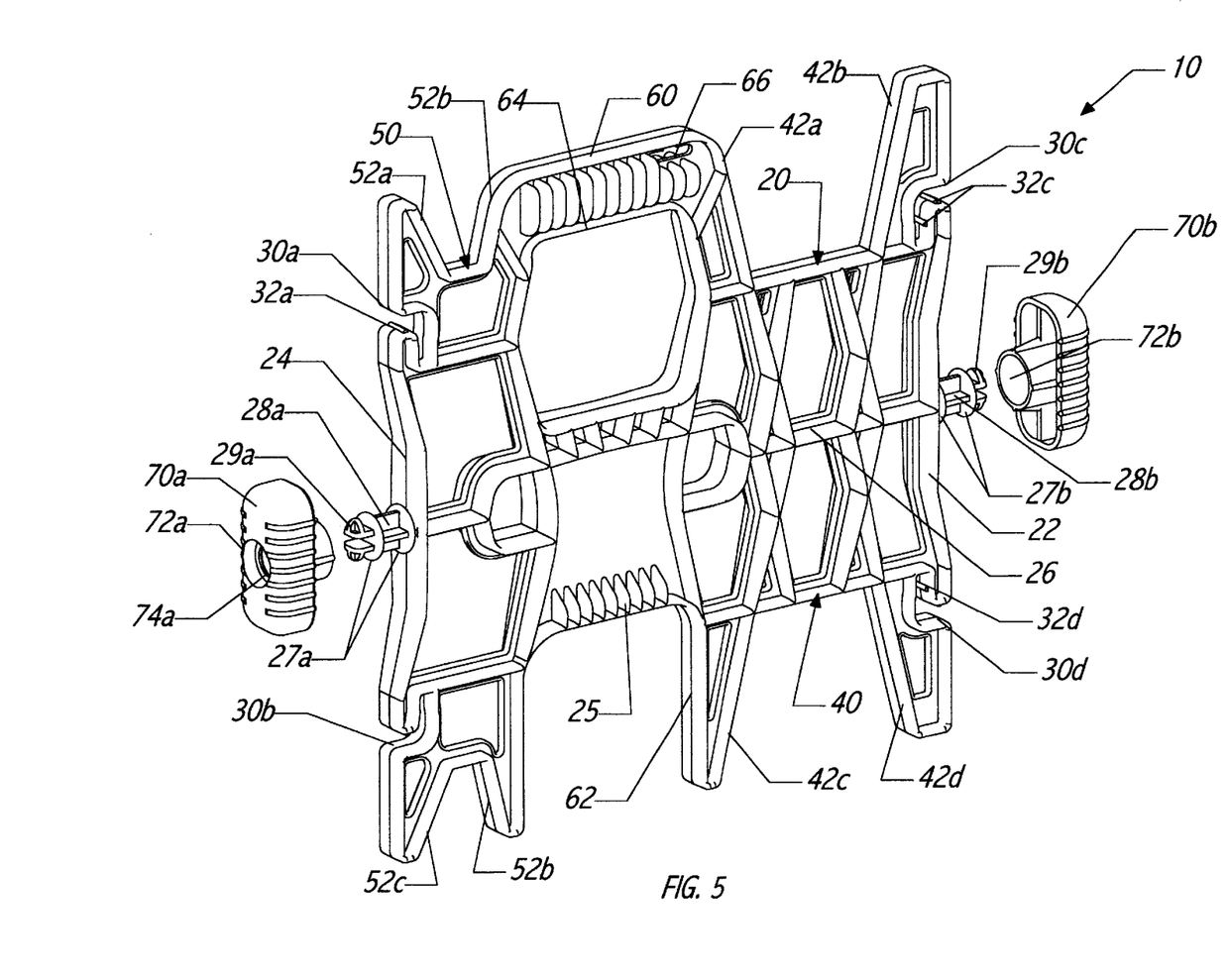
FIG. 5 is an upper perspective view of the present invention.
Figure 6:
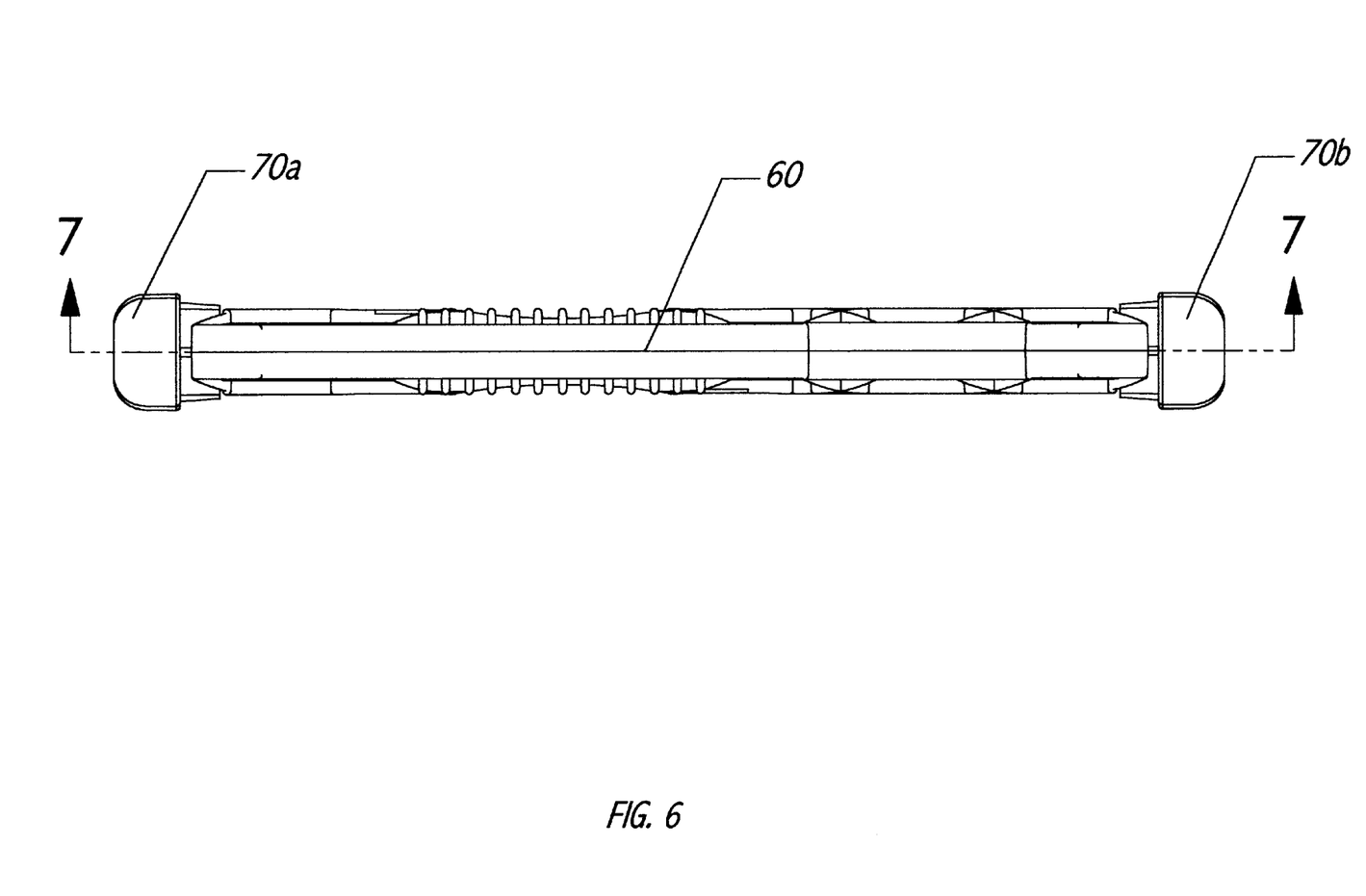
FIG. 6 is a top view of the present invention.

As best shown in FIG. 5, 7 and 9 of the drawings, the frame 20 includes a first spool 40 for storing at least one extension cord 12. The first spool 40 has a plurality of first shoulders 42a–d that retain the extension cord 12 within the first spool 40 during storage and dispensing. It can be appreciated by one skilled in the art that the first spool 40 may be comprised of any well-known shape for spools.

As best shown in FIG. 5, 7 and 9 of the drawings, the frame 20 includes a second spool 50 for storing at least one extension cord 12. The second spool 50 has a plurality of second shoulders 52a–d that retain the extension cord 12 within the second spool 50 during storage and dispensing. It can be appreciated by one skilled in the art that the second spool 50 may be comprised of any well-known shape for spools. It can also be appreciated that more than one spool may be attached to the frame 20 for retaining various elongated structures.

As best shown in FIGS. 4, 5, 7 and 9 of the drawings, a plurality of slots 30a–d extend into the first end 22 and the second end 24 of the frame 20. The slots 30a–d are formed for easily receiving the diameter of the extension cord 12 or other elongated object. The plurality of slots 30a–d include a corresponding number of first nubs 32a–d and second nubs 34a–d for selectively retaining the distal end of the extension cord 12 within the slots 30a–d.

Figure 2:
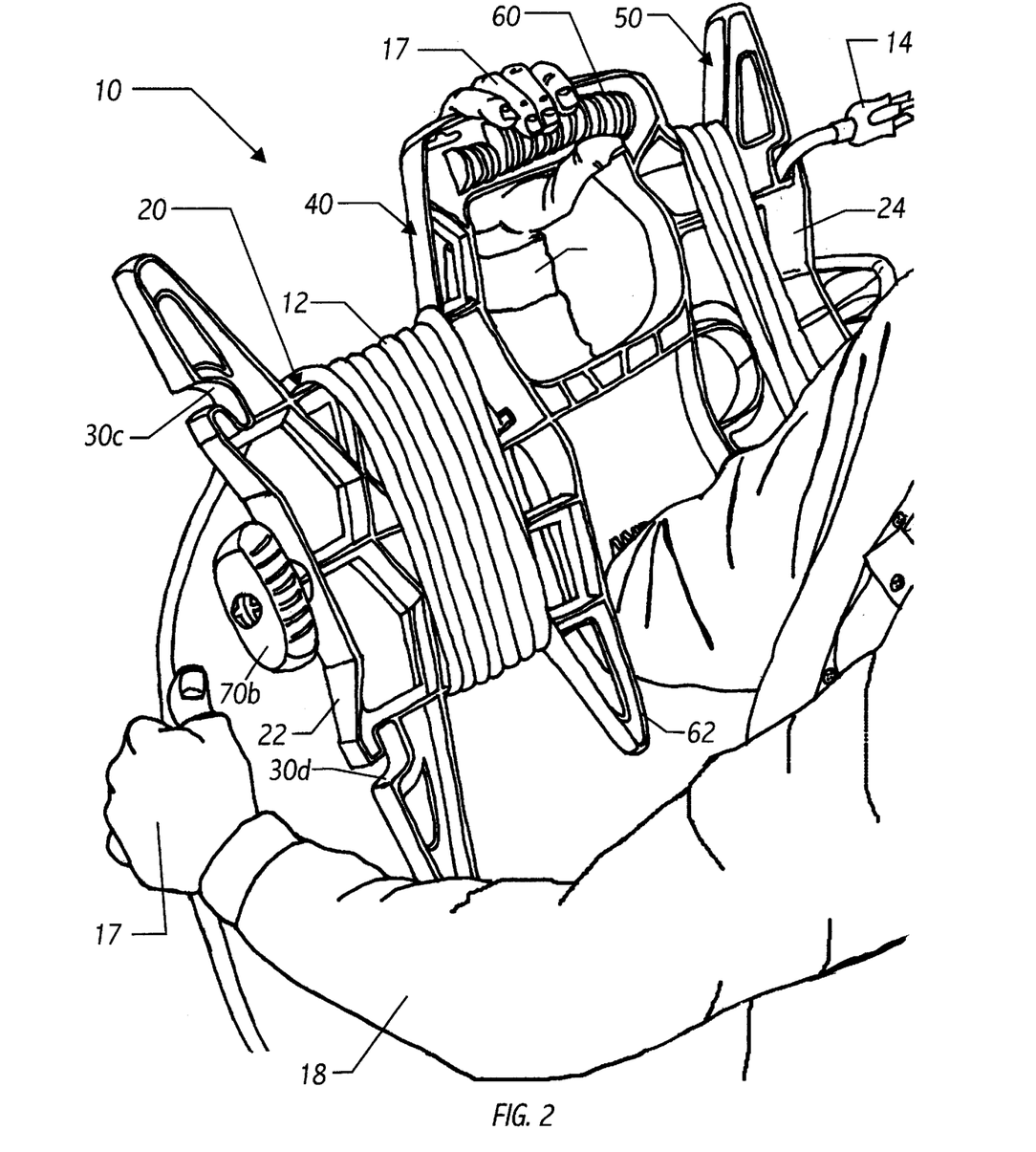
FIG. 2 is an upper perspective view of the present invention with the user's inner elbow being positioned within the U-shaped cutout and their hand grasping the handle for providing leverage during accumulating of the extension cord.

As best shown in FIGS. 4, 5, 7 and 9 of the drawings, a U-shaped cutout 62 extends into a side of the frame 20. The U-shaped cutout 62 is preferably positioned between the first spool 40 and the second spool 50 as shown in FIGS. 7 and 9 of the drawings. The U-shaped cutout 62 is formed for comfortably receiving the inner portion of the elbow of a user as shown in FIG. 2 of the drawings. A plurality of ergonomic ribs 25 are attached to the frame 20 adjacent the U-shaped cutout 62 for providing additional support to the user's arm during operation. It can be appreciated that the cutout 62 may have various other shapes and sizes to accommodate the user's inner elbow.

As shown in FIGS. 4, 5, 7 and 9 of the drawings, a handle 60 is attached to the frame 20 opposite of the U-shaped cutout 62 for the user to grasp with their hand 17 while their inner elbow is positioned within the U-shaped cutout 62. The handle 60 preferably includes a support aperture 66 for allowing positioning of the present invention upon a narrow elongated object such as a nail or other fastener. As best shown in FIGS. 7 and 9 of the drawings, an opening 64 preferably extends through the frame 20 for receiving a portion of the user's hand 17 during grasping of the handle 60. The user's wrist engages a portion of the frame 20 during operation. The handle 60 also preferably includes a plurality of ribs that provide an ergonomic grip for the user's hand 17.

Figure 8:
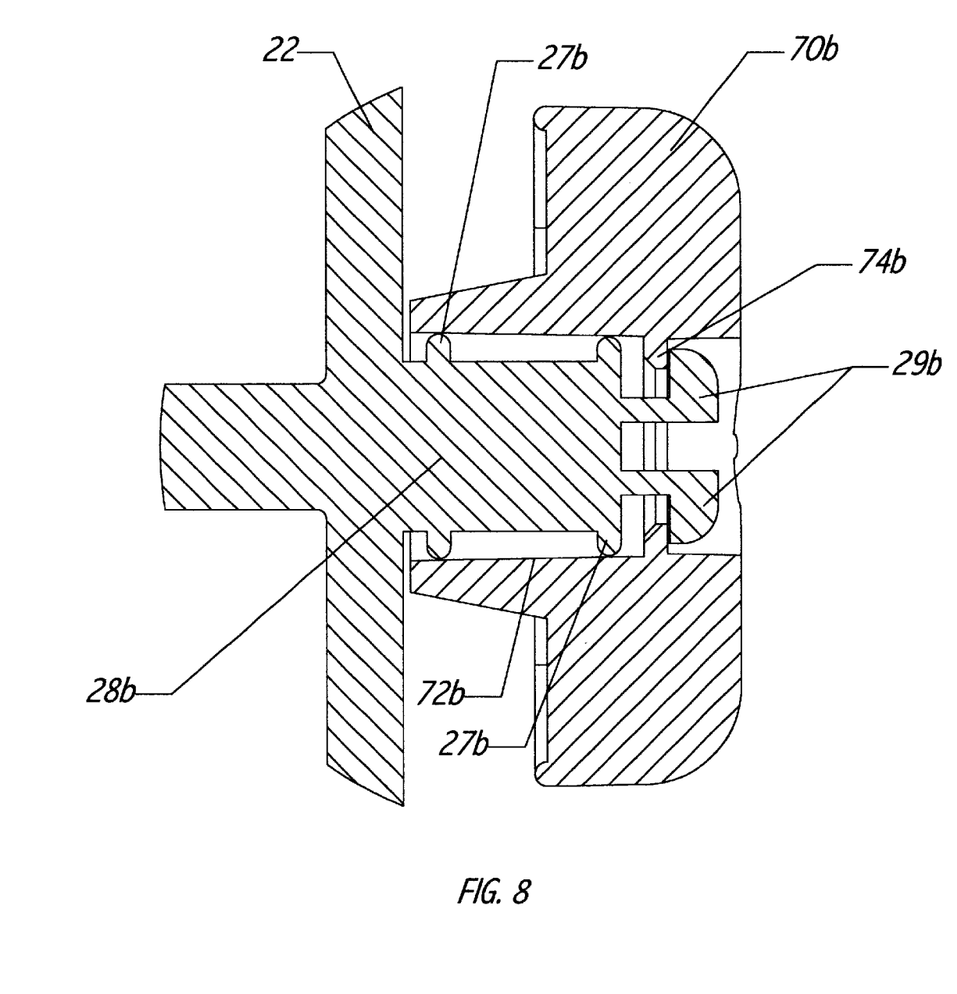
FIG. 8 is a magnified view of the knob and flanged end members that rotatably retain the knob from FIG. 7.

As best shown in FIGS. 7 and 8 of the drawings, a pair of post members 28a–b extend from the first end 22 and the second of the frame 20. Each of the post members 28a–b preferably includes a pair of cinctures 27a–b having a circular disk shape for providing a rotating surface for the knobs 70a–b to rotate about. As shown in FIGS. 5, 7, 8 and 10 of the drawings, a pair of flanged end members 29a–b are attached to the distal end of the post members 28a–b. The flanged end members 29a–b are resilient in structure and are parallel to one another as best shown in FIG. 7 of the drawings.

Figure 10:
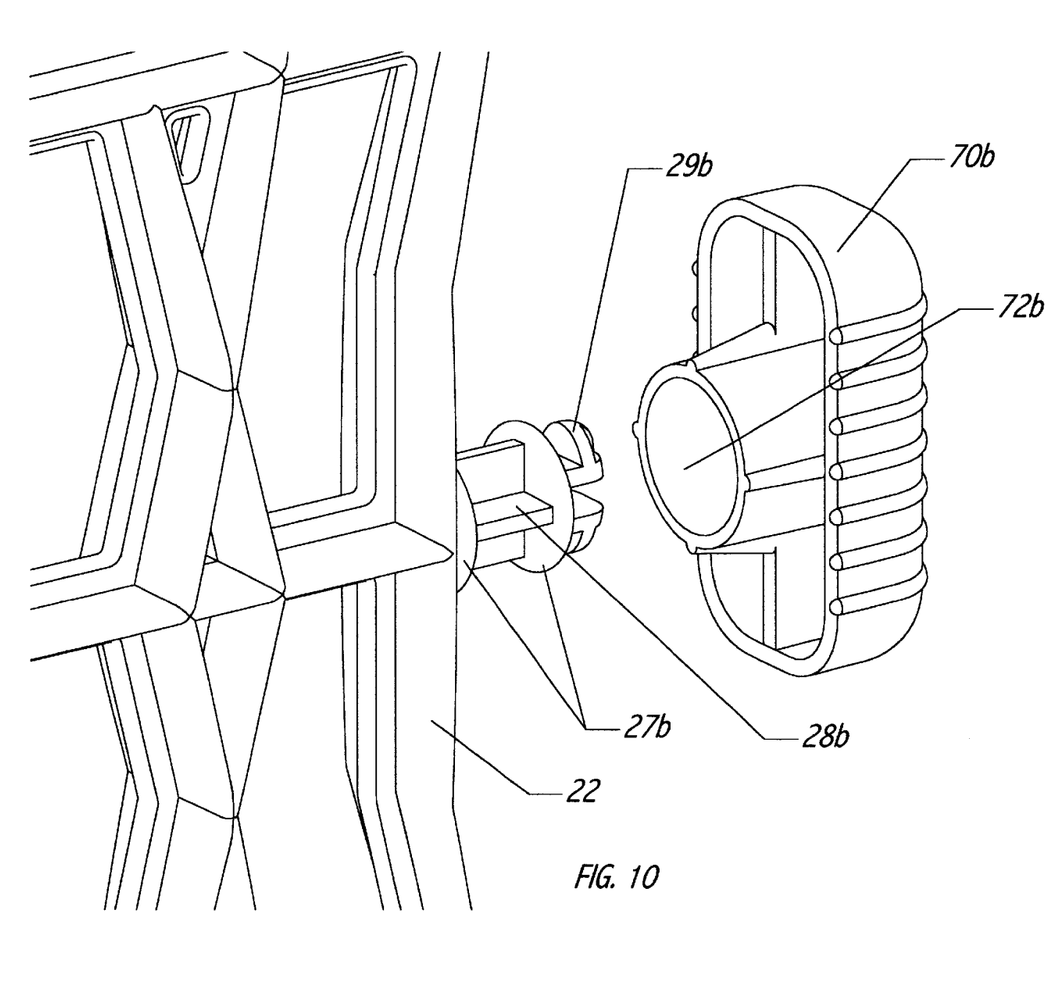
FIG. 10 is an exploded magnified upper perspective view of the knob.

As best shown in FIGS. 7 and 8 of the drawings, each of the knobs 70a–b includes an aperture that extends through forming an elongated lumen 72a–b within each of the knobs 70a–b. The lumen 72a–b have an inner diameter slightly larger than the outer diameter of the cinctures 27a–b of the post members 28a–b for allowing the knobs 70a–b to freely rotate upon the post members 28a–b. An interior flange 74a–b within each of the knobs 70a–b is catchably engageable with the distal ends of the flanged end members 29a–b as shown in FIGS. 7 and 8 of the drawings. As best shown in FIGS. 9 and 10 of the drawings, each of the knobs 70a–b preferably has gripping ribs for increasing the engagement by the user. It can be appreciated by one skilled in the art that the knobs 70a–b my include a post member that is rotatably connected to the frame.

Figure 1:
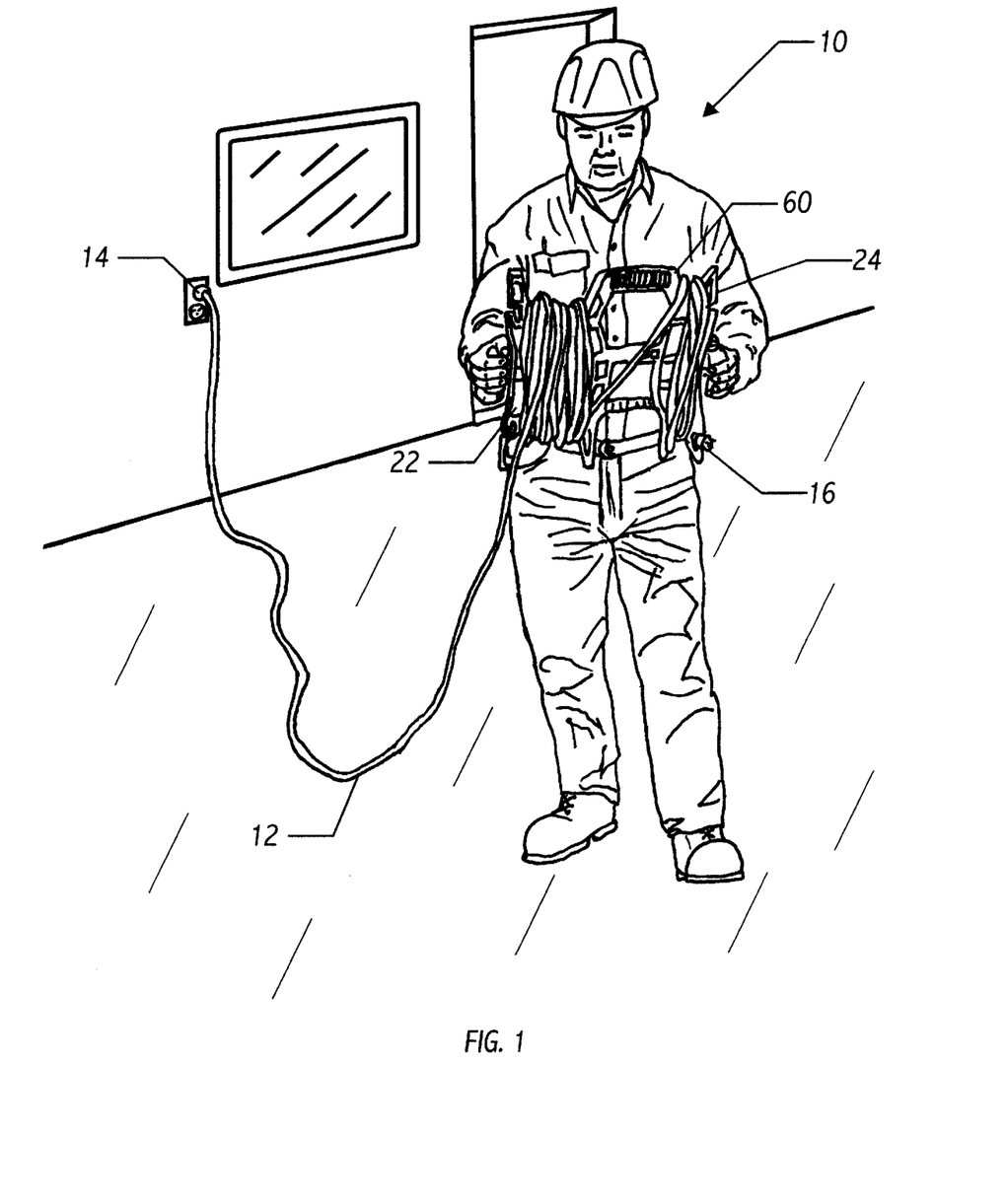
FIG. 1 is an upper perspective view of the present invention with the extension cord being dispensed by a user holding the opposing rotating knobs.
Figure 4:
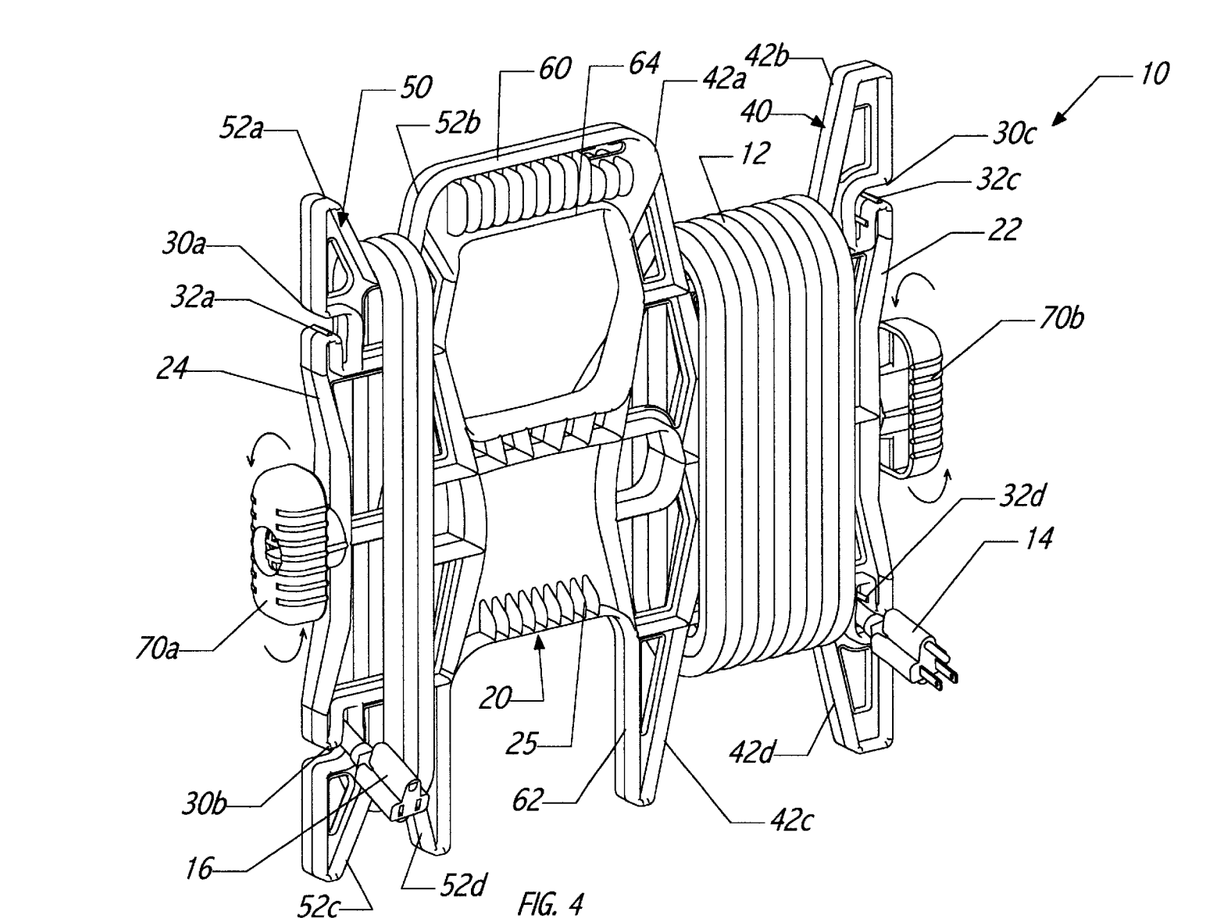
FIG. 4 is an upper perspective view of the present invention with the extension cord wrapped in the storage position.

In use, the user grasps the handle 60 with their hand 17. The inner portion of the U-shaped cutout 62 is positioned within the inner portion of the user's elbow with the wrist 18 of the arm engaging a portion of the frame 20 as shown in FIG. 2 of the drawings. The user then utilizes their other hand 17 to wrap the extension cord 12 about one of the spools 40, 50 while grasping the handle 60 for support. The position of the arm about the frame 20 creates lower torque upon the user's arm during wrapping of the extension cord 12. The user then secures the distal ends of the extension cord 12 within the slots 30a–d as shown in FIG. 4 of the drawings for storage. When the user desires to utilize the extension cord 12, the user releases the extension cord 12 from the slots 30a–d and grasps the opposing knobs 70a–b as shown in FIG. 1 of the drawings. The user then walks away from one of the distal ends of the extension cord 12 allowing the frame 20 to freely rotate about the knobs 70a–b thereby allowing dispensing of the extension cord 12. When the desired length of extension cord 12 is dispensed, the user extends their fingers of their hand 17 to engage the frame 20 thereby terminating rotation of the frame 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A storage and dispensing system for storing and dispensing an elongated object, comprising:
    a frame having a first end and a second end;
    at least one spool within said frame for receiving at least one of said elongated object;
    a handle attached to said frame between said first end and said second end;
    a cutout within said frame opposite of said handle for receiving an inner portion of a user's elbow while said user grasps said handle;
    a first knob rotatably connected to said first end of said frame; and
    a second knob rotatably connected to said second end of said frame, wherein said second knob is concentric with said first knob.

2. The storage and dispensing system of claim 1, wherein said first end includes a first post member for rotatably supporting said first knob and wherein said second end includes a second post member for rotatably supporting said second knob.

3. The storage and dispensing system of claim 2, wherein said first post member and said second post member each include at least two flanged end members for catchably engaging an interior flange within a lumen of said knobs.

4. The storage and dispensing system of claim 3, wherein said first post member and said second post member each include at least one cincture.

5. The storage and dispensing system of claim 1, wherein said frame includes at least one slot for receiving a distal end of said elongated object.

6. The storage and dispensing system of claim 5, wherein said at least one slot includes at least one nub for catchably retaining said elongated object within said at least one slot.

7. The storage and dispensing system of claim 6, wherein said at least one slot has an L-shape.

8. The storage and dispensing system of claim 1, wherein said at least one spool comprises a first spool and a second spool adjacent said first end and said second end respectively.

9. The storage and dispensing system of claim 1, wherein said frame includes an opening adjacent said handle.

10. The storage and dispensing system of claim 9, wherein said frame includes a plurality of ergonomic ribs adjacent said cutout.

11. The storage and dispensing system of claim 10, wherein said cutout has a U-shape.

12. The storage and dispensing system of claim 11, wherein said handle includes a support aperture.

13. The storage and dispensing system of claim 1, wherein said first knob includes a first post member that is rotatably attached to said first end and wherein said second knob includes a second post member that is rotatably attached to said second end.

14. A storage and dispensing system for storing and dispensing an elongated object, comprising:
    a frame having a first end and a second end;
    a first spool and a second spool within said frame for receiving at least one of said elongated object, wherein said first spool has a width greater than a width of said second spool, and wherein said first spool has a height smaller than a height of said second spool;
    a handle attached to said frame between said first end and said second end;
    a cutout within said frame opposite of said handle for receiving an inner portion of a user's elbow while said user grasps said handle;
    a first knob rotatably connected to said first end of said frame; and
    a second knob rotatably connected to said second end of said frame, wherein said second knob is concentric with said first knob.

15. The storage and dispensing system of claim 14, wherein said first end includes a first post member for rotatably supporting said first knob and wherein said second end includes a second post member for rotatably supporting said second knob.

16. The storage and dispensing system of claim 15, wherein said first post member and said second post member each include at least two flanged end members for catchably engaging an interior flange within a lumen of said knobs.

17. The storage and dispensing system of claim 14, wherein said frame includes at least one slot for receiving a distal end of said elongated object.

18. The storage and dispensing system of claim 17, wherein said at least one slot includes at least one nub for catchably retaining said elongated object within said at least one slot.

19. A storage and dispensing system for storing and dispensing an elongated object, comprising:
    a frame having a first spool and a second spool;
    a handle attached to said frame; and
    a cutout within said frame opposite of said handle for receiving an inner portion of a user's elbow while said user grasps said handle.

20. The storage and dispensing system of claim 19, including:

a first knob rotatably connected to a first end of said frame; and a second knob rotatably connected to a second end of said frame, wherein said second knob is concentric with said first knob.

| Index of Elements for Extension Cord Storage and Dispensing System ENVIRONMENTAL ELEMENTS | |
|---|---|
| 10. | Extension Cord Storage and Dispensing System |
| 11. | |
| 12. | Extension Cord |
| 13. | |
| 14. | Male Connector |
| 15. | |
| 16. | Female Connector |
| 17. | Hand |
| 18. | |
| 19. | |
| 20. | Frame |
| 21. | |
| 22. | First End |
| 23. | |
| 24. | Second End |
| 25. | Ergonomic Ribs |
| 26. | Middle Portion |
| 27. | Cincture (a–b) |
| 28. | Post Member (a–b) |
| 29. | Flanged End Members (a–b) |
| 30. | Slots (a–d) |
| 31. | |
| 32. | First Nubs (a–d) |
| 33. | |
| 34. | Second Nubs (a–d) |
| 35. | |
| 36. | |
| 37. | |
| 38. | |
| 39. | |
| 40. | First Spool |
| 41. | |
| 42. | First Shoulders (a–d) |
| 43. | |

| -continued Index of Elements for Extension Cord Storage and Dispensing System ENVIRONMENTAL ELEMENTS | |
|---|---|
| 44. | |
| 45. | |
| 46. | |
| 47. | |
| 48. | |
| 49. | |
| 50. | Second Spool |
| 51. | |
| 52. | Second Shoulders (a–d) |
| 53. | |
| 54. | |
| 55. | |
| 56. | |
| 57. | |
| 58. | |
| 59. | |
| 60. | Handle |
| 61. | |
| 62. | U-shaped Cutout |
| 63. | |
| 64. | Opening |
| 65. | |
| 66. | Support Aperture |
| 67. | |
| 68. | |
| 69. | |
| 70. | Knobs (a–b) |
| 71. | |
| 72. | Lumen (a–b) |
| 73. | |
| 74. | Interior Flange (a–b) |
| 75. | |
| 76. | |
| 77. | |
| 78. | |
| 79. | |

\* \* \* \* \*